Jan. 26, 1937.  R. CADWALLADER  2,068,732

AUTOMOBILE FENDER

Filed Feb. 21, 1934　　2 Sheets-Sheet 1

INVENTOR.
Robert Cadwallader

BY
Harness, Lind, Patee & Harris
ATTORNEYS.

Jan. 26, 1937. R. CADWALLADER 2,068,732
AUTOMOBILE FENDER
Filed Feb. 21, 1934 2 Sheets-Sheet 2
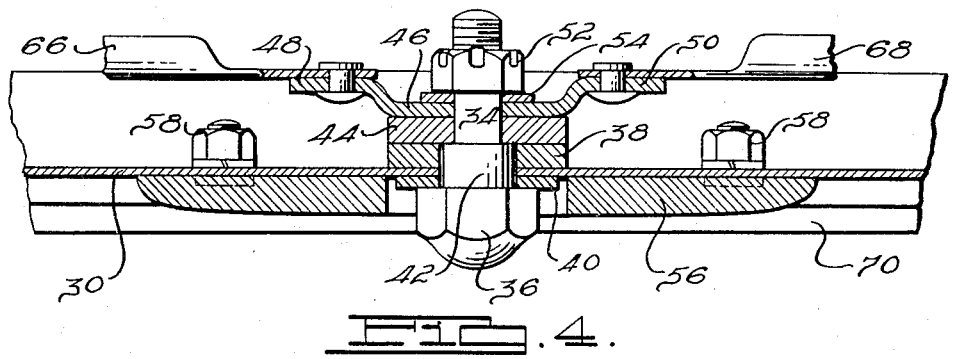
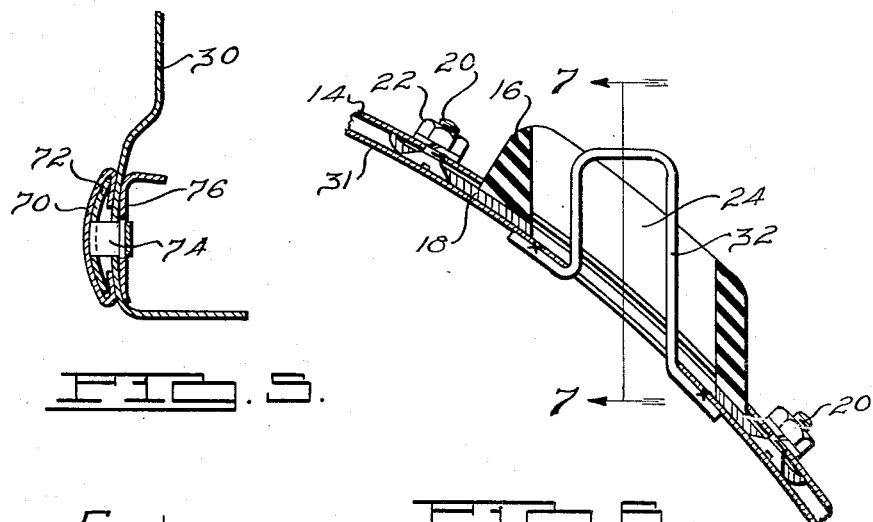
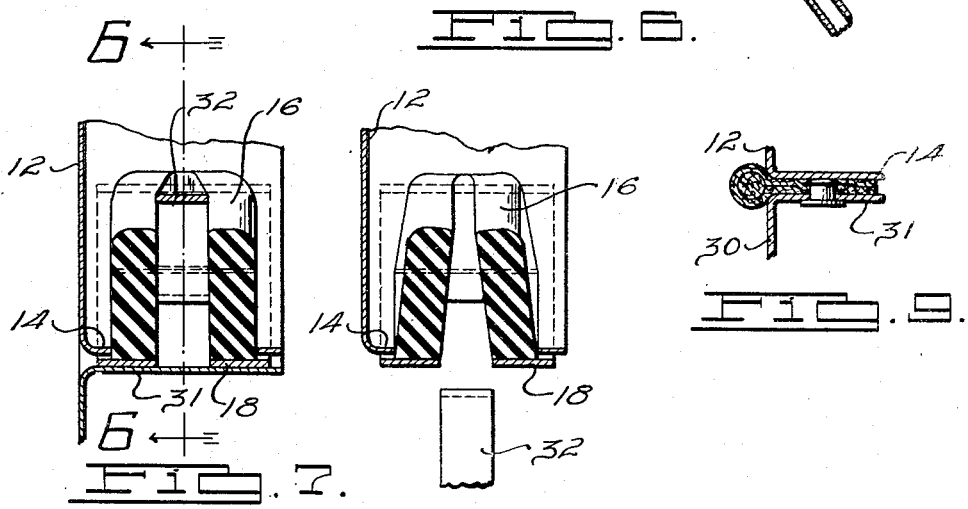
INVENTOR.
Robert Cadwallader.
BY
Harness, Lind, Patee & Harris
ATTORNEYS.

Patented Jan. 26, 1937

2,068,732

UNITED STATES PATENT OFFICE 2,068,732

AUTOMOBILE FENDER

Robert Cadwallader, Highland Park, Mich., assignor to Chrysler Corporation, Detroit, Mich., a corporation of Delaware Application February 21, 1934, Serial No. 712,283

5 Claims. (Cl. 280—153)

This invention relates to a fender and more particularly to an automobile fender in which a closure member is provided for the open side thereof.

An object of the invention is to provide a closure member which substantially covers the upper half of the wheel of an automobile when it is on an automobile below the fender, thereby not only improving the appearance of the automobile fender but preventing mud and water from splashing the body and windows.

A further object of the invention is to provide a detachable guard for the open side of the fender which may be readily assembled or disassembled for the purpose of cleaning or removing the automobile wheel or tire.

Another object of the invention is to provide a novel locking mechanism which securely holds the closure member on the fender, the locking member having been designed to provide radial tension on the adjacent faces of the closure member and the fender.

Further objects and advantages of the invention will more fully appear from the following description taken in connection with the accompanying drawings, in which:

Fig. 4 is a sectional view taken on line IV—IV of Fig. 1, showing the mechanism for operating the locking members;

Fig. 5 is a sectional view taken on line V—V of Fig. 1, showing the construction of the lower edge of the closure member;

Fig. 6 is a sectional view taken on line VI—VI of Fig. 7, showing an enlarged view;

Fig. 7 is a transverse sectional view taken on line VII—VII of Fig. 6, showing a guiding member on the closure member extending into a resilient member carried by the fender;

Fig. 8 is a view corresponding to Fig. 7 except that the guiding member has been removed from the resilient member; and Fig. 9 is a sectional view taken on line IX—IX of Fig. 1, showing on a larger scale the means for securing a beaded sound deadening material to the outer periphery of the closure member.

Figure 1:
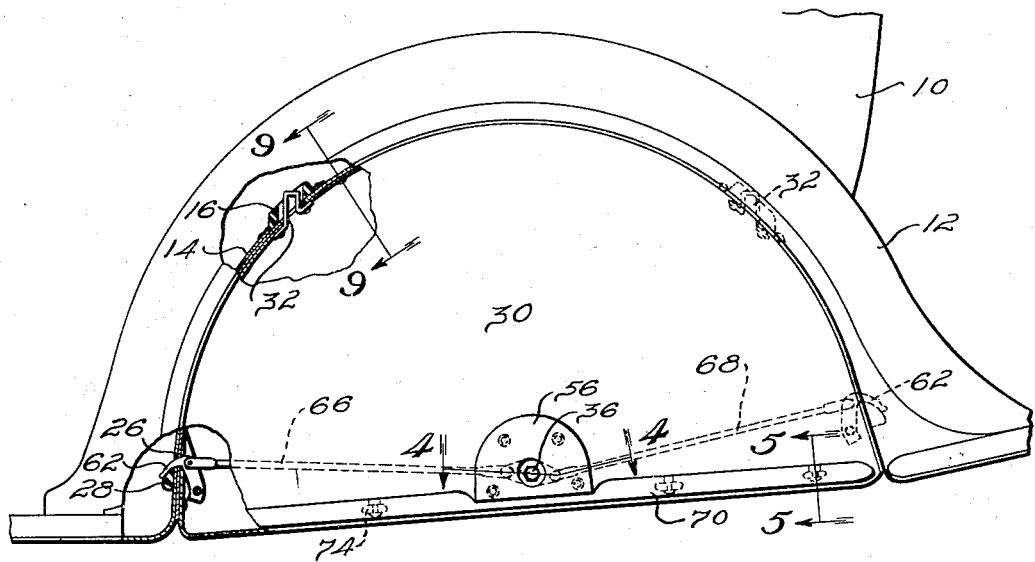
Fig. 1 is a side view of a rear automobile fender, parts being broken away and in section.
Figure 2:
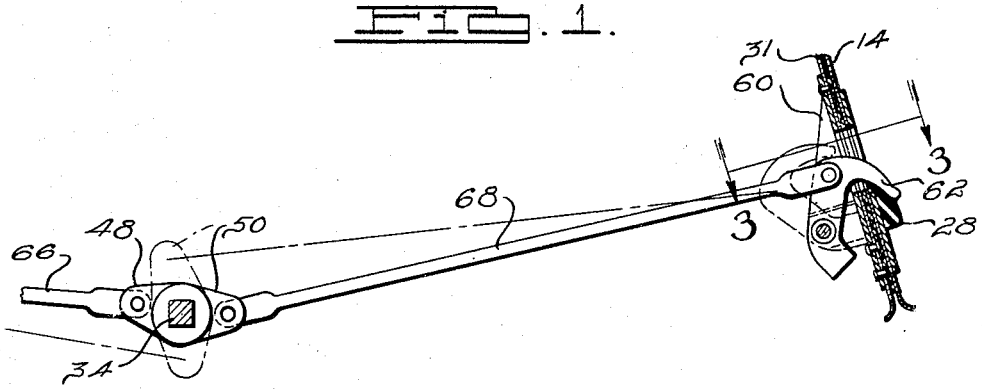
Fig. 2 is an enlarged view of one of the locking members and its operating mechanism, a portion of the closure member and the fender is shown in section.
Figure 3:
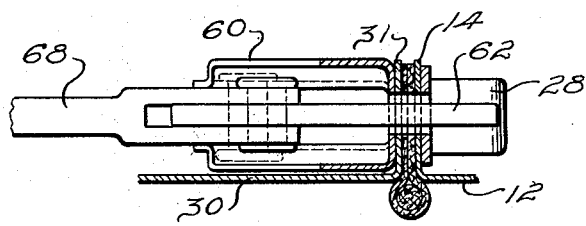
Fig. 3 is a sectional view taken on line III—III of Fig. 2 showing the locking mechanism on a scale larger than that shown in Fig. 2.

Referring to the drawings wherein I have illustrated a preferred embodiment of my invention, I have shown the tonneau of an automobile 10 having a fender 12 of the conventional type. As is customary, the fender is provided with a semicircular opening on its front face through which the wheel or tire of an automobile may be readily removed. At the peripheral edge of the opening I have provided an inturned flange 14, this flange defining the open side of the fender.

Spaced openings have been provided in the inwardly extending flange 14 to receive a resilient member 16 which is carried by a plate 18, the latter being detachably secured to the underside of the flange 14. The resilient member 16 may be secured to the plate 18 by bonding. A bolt 20 extending through the plate and flange receives a nut 22 for securing the plate and its resilient member to the flange. The resilient member 16 and plate 18 are provided with an opening in the form of a slot 24, the portion of the slot adjacent the flange 14 is somewhat wider than it is at the top to provide a gripping action of a member extending into the slot.

Adjacent the lower edges of the fender other openings have been provided through which may extend the locking members hereinafter more fully referred to. Below each of the slot members and positioned on the outer periphery of the flange 14, I have placed resilient members 28 against which the locking members exert a resilient tension. These locking openings are positioned substantially diametrically opposite.

Referring to the closure member I have provided a substantially semi-cylindrical plate portion 30 having at its outer edges an axially extending flange 31 corresponding substantially in size and shape to the flange 14 on the fender. Spaced projections 32 in the form of strap-like members are secured to the under surface of the flange 31. These projections are spaced about the outer periphery of the flange 31 a distance corresponding to the spacing of the openings in the resilient member 16. These projections also extend substantially in a vertical direction so that they may be received in the resilient member by a vertical movement of the closure member into the open side of the fender. The projections are substantially U-shaped in form, the ends of the member being secured to the underside of the flange 31, either by rivets or by spot welding.

At the center of the lower edge of the closure member 30 I have provided an opening through which extends a bolt 34 having a head in the form of a nut 36 for the reception of a tool used in turning the bolt 34. Washers 38 and 40 have been provided around the bolt 34 and spaced on the opposite sides of the closure member 30. An enlarged portion of the bolt 34 is shown at 42 forming a shoulder against which abuts another washer 44. A member 46 having outwardly extending arms 48 and 50 is positioned on the bolt 34 against the washer 44, held in place by a nut 52 screwthreaded onto the bolt 34. A washer 54 is positioned between the nut 52 and the member 46.

The nut 52 securely fastens the member 46 on the bolt so that the latter turns therewith when rotated by a tool on the nut 36. The washer 54, member 46, and washer 44 are securely held against rotation by their engagement with the shoulder formed by the enlarged portion 42, thus the member 46 may be rotated by rotating the nut 36. The shoulder formed by the enlarged portion 42 prevents the washer 38 from being gripped too tightly between the washer 44 and the closure member 30. A reinforcing plate 56 has been provided on the outer surface of the closure member 30 and is secured thereto by bolt 58.

Positioned on the opposite sides of the closure member I have provided brackets 60 diametrically opposite the turning mechanism for the locking members. These brackets are secured to the inner periphery of the flange 31 and pivotally support hook-like members 62, these hook-like members have their free outer ends formed cam-shaped and are adapted to be projected through an opening in the flange of the closure member and the opening 26 in the flange of the fender. The purpose of forming these projections cam-shaped is to cause the closure member 30 to be forced upwardly as the hook member is forced through the opening 26 in the flange of the fender. This cam surface also exerts a radial tension inwardly on the flange of the fender thereby drawing the two flanges tightly together.

Links 66 and 68 are provided between the arms 48 and 50 and the hook 62. When the arms 48 and 50 are in a horizontal position, the hooks 62 are projected into the openings in the two flanges, and when the arms 48 and 50 are in a vertical position the hooks are withdrawn from the openings thereby permitting removal of the closure member. Thus it will be understood that by rotating the nut 36, the hooks 62 may be projected into the openings or out of the openings for the purpose of locking or unlocking the closure member to the fender.

By the arrangement of the projections 32 in a vertical position and the provision of the hook-like locking members, it is possible to position the closure member below the fender and raise it in a vertical direction for positioning it on the fender. The locking members are then turned to locking position, thereby forcing the closure member upwardly as well as drawing the bottom portion of the fender radially inward into tight engagement with the closure member.

In order to form a good seal between the two metallic flanges I have provided a seal of sound deadening material consisting of a beaded strap-like member 69 which is secured to the inwardly extending flange of the closure member. It will be understood that this sound deadening material lies between the two flanges tightly gripped therebetween to form a seal and to prevent any sound caused by the engagement of metallic parts.

At the lower edge of the closure member 30 I have provided a reinforcing member in the form of a bead which is detachably secured to the lower edge of the closure member. A decorative strip 70 is folded over the longitudinal edges of a stiffening member 72 having inwardly extending projections 74 which are received in openings in the lower edge of the closure member. An angle member 76 is positioned on the inner face of the closure member and is provided with openings which receive the projections 74, the outer free ends of the projections are bent over the angle member 76, thereby securely locking the three members on the opposite sides of the closure member 30.

It will be understood that various changes including the size, shape, and arrangement of parts may be made without departing from the spirit of my invention, and it is not my intention to limit the scope thereof other than by the terms of the appended claims.

What I claim is:

1. A closure for the open side of an automobile fender comprising a substantially semicircular cover having an inwardly extending flange at its periphery, spaced projections extending vertically beyond the outer periphery of said flange, and diametrically opposed locking members pivotally mounted at the inner periphery of said flange and extending through said flange for locking engagement with a support.

2. A closure for the open side of an automobile fender comprising a substantially semicircular cover having an inwardly extending flange at its periphery, spaced projections extending vertically beyond the outer periphery of said flange, and diametrically opposed locking members pivotally mounted at the inner periphery of said flange and extending through said flange for locking engagement with a support, said locking members exerting a pressure in a direction parallel to said vertically extending projections and in a direction at right angles thereto.

3. A closure for the open side of an automobile fender comprising a cover having a peripheral flange extending at right angles to the main body portion of said cover, spaced guiding projections extending outwardly beyond the outer periphery of said flange, oppositely positioned supports extending inwardly beyond the inner periphery of said flange, locking members pivotally mounted on said supports each having a downwardly and outwardly extending portion passing through an opening in said flange adjacent said support, and a common means for moving said locking members to position the outer ends of said downwardly and outwardly extending portion from a position flush with the outer periphery of said flange to a position outwardly beyond the outer periphery of said flange.

4. The combination of an automobile fender having an inwardly extending flange at its edge defining an open outer side through which a tire may pass axially, said flange having elongated openings for the reception of guiding means, resilient material around the elongated openings, a closure for the open side of said fender comprising a body portion having an inwardly extending flange at its edge conforming to the contour of said fender flange, guiding members on said closure flange adapted to be received in the openings in said fender flange and adapted to engage the side edges of the resilient material but free from engagement with the ends of the openings, and locking means carried by said closure for engagement with said fender.

5. The combination of an automobile fender having a crown portion and an open side, a closure member for the open side of said fender having its outer periphery conforming to the edge of the fender defining the opening, a sound deadening member on the outer periphery of said closure member for engagement with the inner edge of said fender, guiding members on said closure member, resilient means on said fender for receiving and positioning said guiding means against inner and outer movement but permitting movement at right angles thereto, and locking means carried by said closure member adapted to engage said fender to draw the adjacent edges of said fender and said closure member together.

ROBERT CADWALLADER.